United States Patent
Gaderer

(10) Patent No.: US 10,397,380 B2
(45) Date of Patent: Aug. 27, 2019

(54) NETWORK DEVICE FOR COMPUTER NETWORK AND METHOD FOR TRANSMITTING DATA WITH NETWORK DEVICE

(71) Applicant: TTTech Computertechnik AG, Vienna (AT)

(72) Inventor: Georg Gaderer, Vienna (AT)

(73) Assignee: TTTech Computertechnik AG, Vienna (AT)

( * ) Notice: Subject to any disclaimer, the term of this patent is extended or adjusted under 35 U.S.C. 154(b) by 0 days.

(21) Appl. No.: 15/977,079

(22) Filed: May 11, 2018

(65) Prior Publication Data

US 2018/0343327 A1 Nov. 29, 2018

(30) Foreign Application Priority Data

May 24, 2017 (EP) .................................... 17172772

(51) Int. Cl.
*H04L 29/08* (2006.01)
*H04L 1/00* (2006.01)
*H04L 12/407* (2006.01)
*H04L 29/06* (2006.01)

(52) U.S. Cl.
CPC .......... *H04L 69/324* (2013.01); *H04L 1/0061* (2013.01); *H04L 12/407* (2013.01); *H04L 63/123* (2013.01); *H04L 2212/00* (2013.01)

(58) Field of Classification Search
CPC ... H04L 69/324; H04L 1/0061; H04L 12/407; H04L 63/123; H04L 2212/00
See application file for complete search history.

(56) References Cited

U.S. PATENT DOCUMENTS

| 6,226,771 B1 | 5/2001 | Hilla et al. |
| 2006/0227811 A1 | 10/2006 | Hussain et al. |
| 2008/0037540 A1* | 2/2008 | Ngo ............... H04L 1/0041 370/392 |
| 2008/0186988 A1 | 8/2008 | Carmon et al. |

OTHER PUBLICATIONS

European Search Report issued in Application No. 17172772.0, completed Jul. 21, 2017 (1 page).

* cited by examiner

*Primary Examiner* — Curtis A Alia
(74) *Attorney, Agent, or Firm* — Eversheds Sutherland (US) LLP

(57) ABSTRACT

A network device for a computer network (1), the network device (2) including communication channels (3), a PHY chip (4) configured for transmitting data in a raw data stream on the communication channels, and a MAC chip (5) configured for encapsulating data to be transmitted into frames, and for calculating a checksum for each frame. The PHY chip is configured for receiving frames of the MAC chip and transmitting transmission data contained in the frames via at least one of its communication channels. The PHY chip is configured to calculate, after receiving a frame and before sending the data of the frame in a raw data stream, a checksum of the data contained in the frame, and to this checksum with the CRC contained in the frame. The data contained in the frame are transmitted if the comparison of the checksums delivers identical values. If the comparison delivers non-identical values, then a specifiable or specified action is executed.

9 Claims, 5 Drawing Sheets

Figure 1:
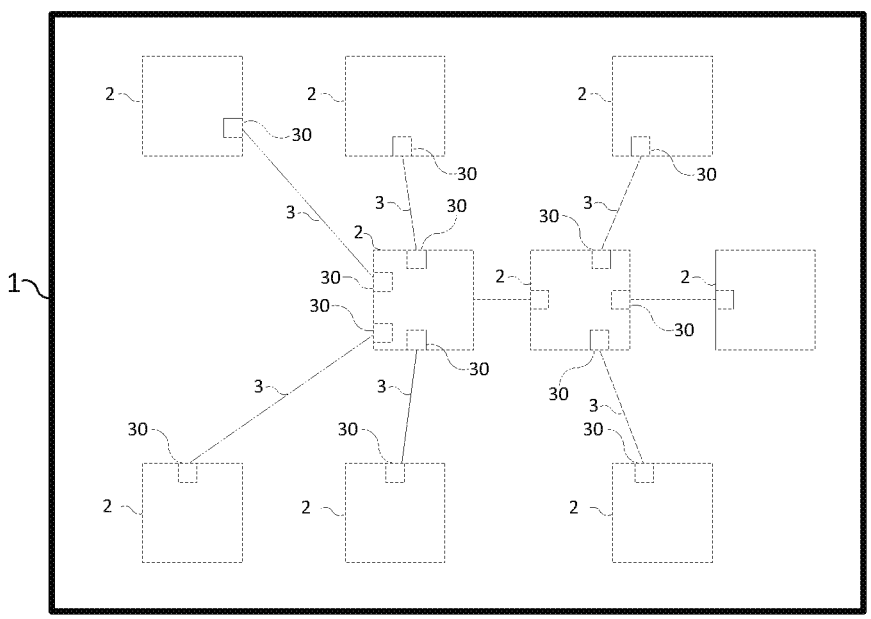

NETWORK DEVICE FOR COMPUTER NETWORK AND METHOD FOR TRANSMITTING DATA WITH NETWORK DEVICE

The invention relates to a network device for a computer network, wherein said network device comprises
one or more communication channels,
at least one PHY chip (physical layer chip), wherein said at least one PHY chip is configured for transmitting data in a raw data stream on said one or more communication channels, and
and at least one MAC chip (medium access control layer chip) which is configured
for encapsulating data to be transmitted, the so-called transmission data, into frames,
calculating a checksum, the so-called MAC checksum, for each of said frames, wherein the MAC checksum of a frame is calculated from the transmission data of said frame,
writing the checksum of each frame into the corresponding frame,
sending frames to said at least one PHY chip for being transmitted by said at least one PHY chip via at least one of said communication channels of the network device,
and wherein said at least one PHY chip is configured for receiving frames of said at least one MAC chip and to transmit the transmission data contained in said frames via its communication channel or via at least one of its communication channels.

Furthermore, the invention relates to a method for detecting faults in a network device, in particular faults of a MAC chip or of MAC chips of said network device, for a computer network, wherein said network device comprises
one or more communication channels,
at least one PHY chip, wherein said at least one PHY chip is configured for transmitting data in a raw data stream on said one or more communication channels, and
and at least one MAC chip which is configured
for encapsulating data to be transmitted, the so-called transmission data, into frames,
calculating a checksum, the so-called MAC checksum, for each of said frames, wherein the MAC checksum of a frame is calculated from the transmission data of said frame,
writing the checksum of each frame into the corresponding frame,
sending frames to said at least one PHY chip for being transmitted by said at least one PHY chip via at least one of said communication channels of the network device,
and wherein said at least one PHY chip is configured for receiving frames of said at least one MAC chip and to transmit the transmission data contained in said frames via its communication channel or via at least one of its communication channels.

A communication channel (also denoted as "channel") refers to a wired (e.g., as copper wire or fiber optics) or wireless (e.g., terrestrial wireless, satellite, infrared or lasers through the air) physical transmission medium. A channel is used to convey an information signal, for example a digital bit stream, from one or several senders (or transmitters) to one or several receivers.

The wording "a network device comprises one or more communication channels" means that said network device is connected to said one or more communication channels.

Typically, a network device comprises one or more ports as channel endpoints, wherein each port can be connected with one communication channel.

Figure 5:
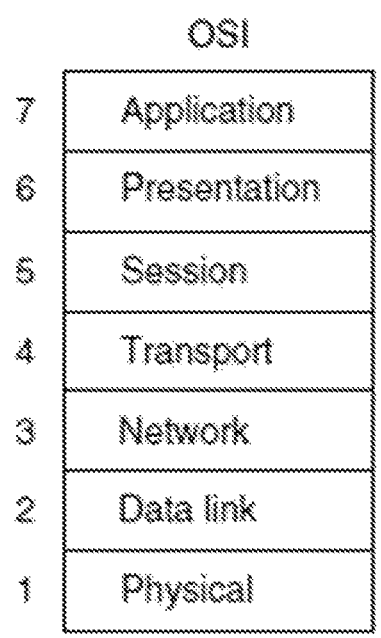

Network computer devices (both end-systems and switches) are typically described and designed according to the OSI reference model. This model separates the networked system into seven abstraction layers where each layer performs a well-defined function, uses the services from the layer below it, and offers its services to the layer above (see FIG. 5) [1].

The physical layer is responsible for transmitting raw bits over a communication channel or over communication channels of a network device. This layer specifies which electrical signals (e.g., how many volts) are used to represent 0 and 1, how long it takes for a bit to be transmitted, and defines electrical and physical specifications for network devices. It interacts with the physical media (e.g., copper wire) and ensures that the data is transmitted with a low bit error rate. To achieve this, the physical layer may implement advanced data coding and signal processing techniques. The physical layer also specifies physical connectors and cables (e.g., twisted pair copper, optical, etc.).

The data link layer is the second layer and brakes the stream of 0's and 1's into data frames and deals with the logical operations for data transmitted on the network. Functions offered by the data link layer are media arbitration and flow control as well as addressing, switching and media access control (MAC). It also provides mechanisms to detect and correct errors from the physical layer. This is normally done by building cyclic redundancy checksums (CRCs) of the data frames.

Typically, functions of a particular layer are encapsulated and implemented on separate hardware or software modules. For example, a separate hardware module, the so-called "physical layer chip" (or "PHY chip") implements the physical layer functionality, and a "data link chip" (also called "Media Access Control (MAC) chip") implements the data link layer functionality.

A PHY chip and a MAC chip of a network device normally communicate over standardized interfaces such as a "Media-independent interface" (MII) or a "reduced media-independent interface" (RMII).

It is an object of the invention to describe a network device which provides higher fault isolation capability compared to network devices available on the market.

This object is achieved with a network device and with a method executed in such a network described in the introduction, wherein according to the invention the at least one PHY chip is further configured
to calculate, after receiving a frame from a MAC chip and before sending the transmission data of said frame in a raw data stream out to a communication channel, a checksum, the so-called PHY checksum, of the transmission data contained in said frame, and
to compare the MAC checksum of a frame with the PHY checksum calculated for this frame,
and wherein the PHY chip is configured to transmit the transmission data—in form of a raw data stream—contained in said frame via the at least one communication channel, if the comparison of the MAC checksum of a frame with the PHY checksum delivers identical values,
and wherein the PHY chip or the network device is configured to execute at least one specified or specifiable action, if the comparison of the MAC checksum of a frame with the PHY checksum delivers values, which are not identical.

Furthermore, this object is achieved with a computer network comprising a plurality of network devices and a plurality of communication channels, wherein each communication channel connects at least two network devices to allow communication between connected network devices including an exchange of messages according to a network protocol (e.g., Ethernet, AFDX, Time Triggered Protocol), wherein one or more network devices is/are constructed as a network device as described above.

A MAC chip of a network device may be faulty and may output frames with faulty CRCs. According to the invention, a PHY chip of a network device performs an additional task of checking the functionality of the MAC chip (MAC chip). The PHY chip receives a frame from the MAC chip and, before sending the frame as a data stream out to the physical medium (communication channel), it calculates the PHY checksum of the received frame (of the transmission data contained in said frame) and compares it to the MAC checksum already contained in said received frame. If these CRC values don't match, the MAC chip might be faulty and the PHY chip, for example, reports an error, otherwise it sends the frame as a data stream (raw data stream) out to the communication channel.

For example, a network device is a switch or an end system, e.g. a personal computer or a control unit.

Advantageous embodiments of the network device, computer system and method, are detailed hereinafter:

The at least one specified or specifiable action is one or more of the following actions:
  reporting an error, preferably to an error-handling module, especially an error-handling hardware or software module;
  stopping the MAC chip from transmitting frames to the PHY chip or stopping the MAC chip from transmitting frames—via the PHY chip—to a port, if the comparison of the MAC checksum and the PHY checksum for a frame designated for said port has revealed non identical values;
  discarding the frame;
  stopping the network device from sending data into the computer network;
  further executing the comparison of the PHY checksums and the MAC checksums of additional frames, and in the case that in the following comparison of said additional frames a specified or specifiable number of non-identical checksums occurs for the same MAC chip:
    reporting an error, preferably to an error-handling module, especially an error-handling software module, or
    stopping the MAC chip from transmitting frames to the PHY chip, and preferably reporting an error, or
    stopping the MAC chip from transmitting frames—via the PHY chip—to a port, if the comparisons of the MAC checksum and the PHY checksum for frames designated for said port have revealed non identical values, and preferably reporting an error,
  and wherein preferably the frames for which the comparison reveals non identical checksums are discarded, or
stopping the network device from sending data into the computer network, or do a well-defined action as, e.g., reporting an error.

In the following, in order to further demonstrate the present invention, illustrative and non-restrictive embodiments are discussed, as shown in the drawings, which show:
  FIG. 1 computer network,
  FIG. 2 network device according to the invention,
  FIG. 3 an example of a method according to the invention executed in a network device as depicted in FIG. 2,
  FIG. 4 two different network devices according to the invention connected via a communication channel, and
  FIG. 5 the seven abstraction layers according to the OSI reference model.

FIG. 1 depicts a computer network 1 comprising a plurality of network devices 2 and a plurality of communication channels 3, wherein each communication channel 3 directly connects two network devices 2 to allow communication between the network devices 2 of the computer network, wherein said communication includes an exchange of messages according to a network protocol.

A computer network 1 according to the invention comprises one or more network devices 2 according to the invention, which network device will be described in more detail in the following. A network device according to the invention may be connected to one or more other network devices according to the invention, to one or more network devices according to the state-of-the art, or to one or more network devices according to the invention and one or more network devices according to the state-of-the art.

Figure 2:
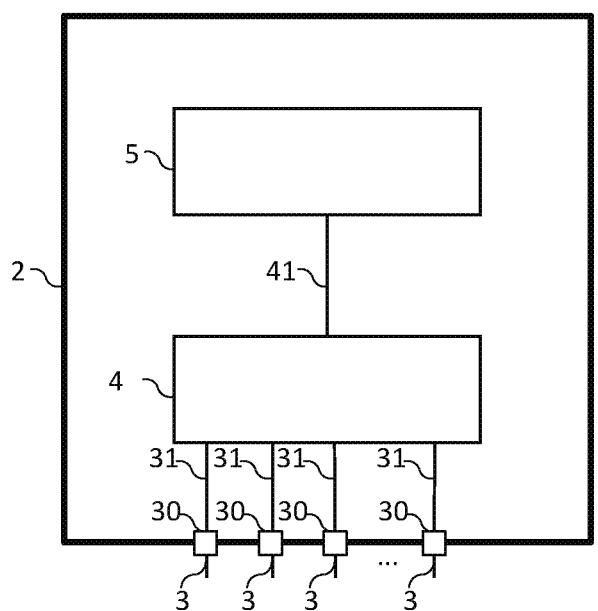

FIG. 2 shows a network device 2 according to the invention. Such a network device 2 comprises at least one PHY chip, in particular one PHY chip 4, wherein said PHY chip 4 is configured for transmitting data in a raw data stream on one or more communication channels 3 to one or more other network devices.

In particular, the PHY chip 4 is connected via connection lines 31 to one or more ports 30, and each communication channel 3 is connected to a port 30 of the network device 2.

Furthermore, the network device 2 comprises at least one MAC chip, in particular one MAC chip 5. Said MAC chip 5 is connected to the PHY chip 4 via a connection line 41.

Figure 3:
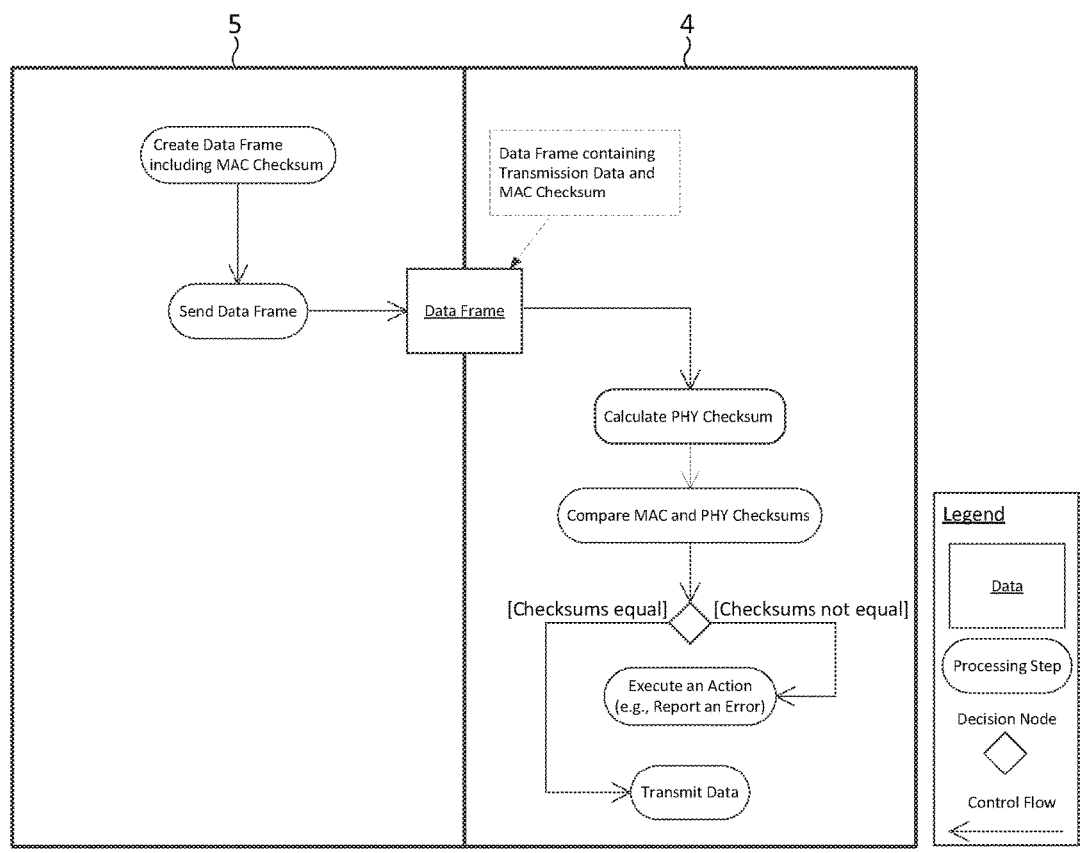
Figure 4:
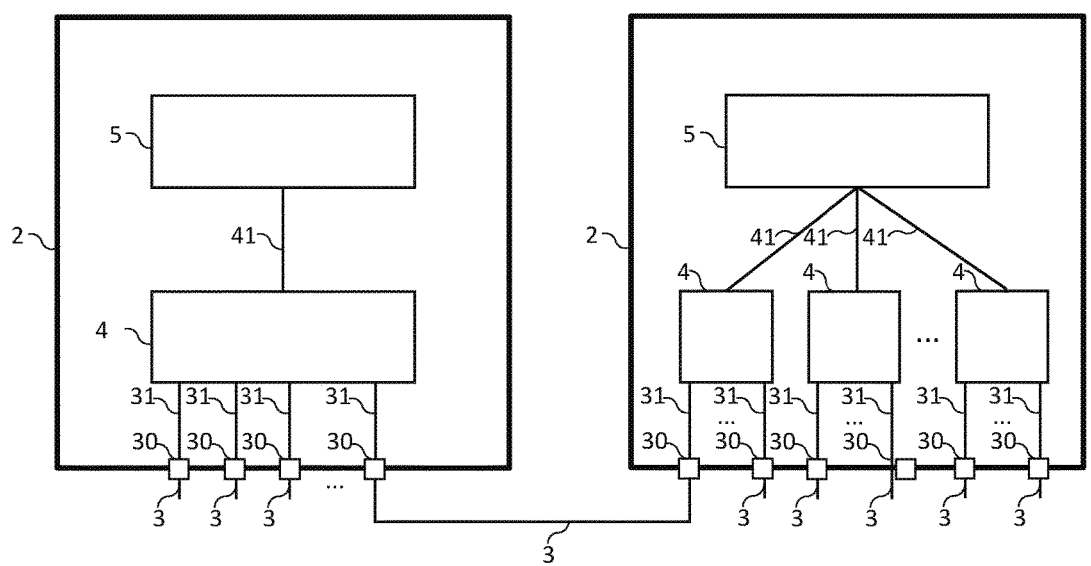

As can be seen further in FIG. 3, the MAC chip 5 is configured for encapsulating data to be transmitted ("the so-called transmission data") into frames. Furthermore, the MAC chip 5 is configured to calculate a MAC checksum (e.g., CRC checksum) for each of said frames. In particular, the MAC checksum of a frame is calculated from the transmission data contained in said frame. The MAC checksum of a frame is written into said frame, so that the frame is containing the transmission data and the corresponding MAC checksum. Optionally, a frame may contain additional information.

As further shown in FIG. 3, the PHY chip 4 is configured for receiving said frames containing transmission data and a checksum of this transmission data (MAC checksum), which frames are transmitted to said PHY chip 4 from the MAC chip 5, so that the transmission data contained in said frames can be transmitted by the PHY chip 4 via one or more of the communication channel 3 of the network device 2.

In case of two or more communication channels, different situations with respect to the question via which communication channel(s) the data/frames will be transmitted may occur, for example depending on the intended receiver(s) to which the data have to transmitted.

According to the invention, as depicted in FIG. 3, the at least one PHY chip 4 of the network device 2 is further configured to calculate—after receiving a frame and before sending the transmission data contained in said frame in a raw data stream—a checksum ("the so-called PHY checksum"), of the transmission data contained in said frame. After calculating the PHY checksum of the transmission data of a frame the PHY chip 4 compares the MAC checksum contained in said frame with the PHY checksum calculated for this frame.

In case that said comparison of the MAC checksum of a frame and the PHY checksum of said frame delivers identical values, the PHY chip 4 transmits the said frame as raw bit data via one (or more) communication channel(s).

In case that said comparison of the MAC checksum of a frame and the PHY checksum of said frame delivers diverging values, the PHY chip 4 executes at least one action, for example reporting an error, discarding the frame, stopping complete data transmission, etc.

Preferably, the PHY chip and the MAC chip calculate the PHY checksum and the MAC checksum, respectively, with the same algorithm or following the same rules/instructions, so that it is ensured that in case that the frame, in particular the transmission data of said frame, used for generating the PHY checksum and the frame, in particular the transmission data of said frame, used for generating the MAC checksum are identical, the PHY checksum and the MAC checksum are identical, too. Accordingly, identical PHY and MAC checksum clearly show that the frames (or the transmission data in said frames) are identical, whereas non identical PHY and MAC checksum clearly show that the frames, in particular the transmission data, are not identical.

FIG. 4 shows a section of an example of a computer network according to the invention. This section shows two network devices 2, wherein the left network device 2 is constructed as a network device according to FIG. 2. The right network device 2 comprises a MAC chip 5 and two or as shown more PHY chips 4. Each PHY chip 4 is connected to one or more ports 30, in the example shown each PHY chip 4 is connected to three ports 31 with connection lines 30.

One of the two network devices or both network devices may be constructed according to the invention, as described in detail with reference to FIG. 3.

Considering the case where at least the right network device 2 is constructed according to the invention, at least one of the two or more PHY chips 4, preferably each of the PHY chips 4, of said right network device is/ate configured to calculate a PHY checksum for frames received from the MAC chip and to execute one or more actions as described above.

Not depicted in the figures are network devices according to the invention, which comprise at least one PHY chip and two or more MAC chips, which are connected to one or more of the PHY chips. Such network devices may also be constructed according to the invention.

Commercially the present invention allows to develop network devices, for example for aerospace systems, with a much higher fault isolation capability compared to network devices actually available on the market.

A network device according to the invention is capable of checking itself against issuing detectable erroneous data. This is of special interest and benefit when it comes to TTEthernet, but would also add an additional value for the AFDX and Ethernet use case.

CITATIONS

[1] Andrew Tanenbaum. 2002. *Computer Networks* (4th ed.). Prentice Hall Professional Technical Reference.

The invention claimed is:

1. A network device for a computer network (1), the network device (2) comprising:
one or more communication channels;
at least one PHY chip (4), which is configured for transmitting data in a raw data stream on the one or more communication channels (3); and
and at least one MAC chip (5) which is configured to:

encapsulate data to be transmitted, which is transmission data, into frames,
calculate a checksum, which is a MAC checksum, for each of the frames, wherein the MAC checksum of a frame is calculated from the transmission data of the frame,
write the checksum of each frame into the corresponding frame, and
send the frames to the at least one PHY chip (4) for being transmitted by the at least one PHY chip (4) via at least one of the communication channels (3) of the network device (2),
wherein the at least one PHY chip (4) is configured to receive frames of the at least one MAC chip (5) and to transmit the transmission data contained in the frames via its communication channel (3) or via at least one of its communication channels (3),
wherein the at least one PHY chip (4) is further configured to:
calculate, after receiving a frame from the at least one MAC chip (5) and before sending the transmission data of the frame in a raw data stream out to a communication channel (3), a checksum, which is a PHY checksum, of the transmission data contained in the frame, and
compare the MAC checksum of a frame with the PHY checksum calculated for this frame,
wherein the at least one PHY chip (4) is configured to transmit the transmission data contained in the frame via the at least one communication channel (3), if the comparison of the MAC checksum of a frame with the PHY checksum delivers identical values, and
wherein the at least one PHY chip (4) or the network device (2) containing the at least one PHY chip is configured to execute at least one specified or specifiable action, if the comparison of the MAC checksum of a frame with the PHY checksum delivers values that are not identical.

2. The network device according to claim 1, which is configured such that the at least one specified or specifiable action is one or more of the following actions:
reporting an error to an error-handling module, especially an error-handling hardware or software module;
stopping the at least one MAC chip (5) from transmitting frames to the at least one PHY chip (4) or stopping the at least one MAC chip (5) from transmitting frames—via the at least one PHY chip (4)—to a port, if the comparison of the MAC checksum and the PHY checksum for a frame designated for the port has revealed non identical values;
discarding the frame;
stopping the network device (2) from sending data into a computer network (1);
further executing a comparison of the PHY checksums and the MAC checksums of additional frames, and if following comparison of said additional frames a specified or specifiable number of non identical checksums occurs for the same at least one MAC chip (5), then:
reporting an error to an error-handling module, especially an error-handling software module, or
stopping the at least one MAC chip (5) from transmitting frames to the at least one PHY chip (4), or
stopping the at least one MAC chip (5) from transmitting frames—via the at least one PHY chip (4)—to a port, if the comparisons of the MAC checksum and the PHY checksum for frames designated for said port have revealed non identical values, or stopping the network device (2) from sending data into the computer network (1).

3. The network device according to claim 2, which is further configured such that if the specified or specifiable number of non identical checksums occurs for the same at least one MAC chip (5), then the frames for which the comparison reveals non identical checksums are discarded.

4. The network device according to claim 2, which is further configured such that if the specified or specifiable number of non identical checksums occurs for the same at least one MAC chip (5), then the at least one specified or specifiable action of the stopping the at least one MAC chip (5) from transmitting frames to the at least one PHY chip (4), the stopping the at least one MAC chip (5) from transmitting frames via the at least one PHY chip (4) to a port, or the stopping the network device (2) from sending data into the computer network (1), further comprises reporting an error.

5. A computer network (1) comprising:
a plurality of network devices (2); and
a plurality of communication channels (3),
wherein each communication channel (3) connects at least two network devices to allow communication between connected network devices (2) including an exchange of messages according to a network protocol, and
wherein at least one of the plurality of network devices is the network device according to claim 1.

6. A method for detecting faults in a network device, in particular faults of a MAC chip or of MAC chips of the network device, for a computer network (1), wherein the network device (2) comprises
one or more communication channels (3),
at least one PHY chip (4) which is configured for transmitting data in a raw data stream on the one or more communication channels (3), and
and at least one MAC chip (5) which is configured to:
encapsulate data to be transmitted, which is transmission data, into frames,
calculate a checksum, which is a MAC checksum, for each of the frames, wherein the MAC checksum of a frame is calculated from the transmission data of the frame,
write the checksum of each frame into the corresponding frame, and
send the frames to the at least one PHY chip (4) for being transmitted by the at least one PHY chip (4) via at least one of the communication channels (3) of the network device (2),
wherein the at least one PHY chip (4) is configured to receive frames of the at least one MAC chip (5) and to transmit the transmission data contained in the frames via its communication channel (3) or via at least one of its communication channels (3),
the method comprising the at least one PHY chip (4):
calculating, after receiving a frame from the at least one MAC chip (5) and before sending the transmission data of the frame in a raw data stream out to a communication channel (3), a checksum, which is a PHY checksum, of the transmission data contained in the frame; and
comparing the MAC checksum of a frame with the PHY checksum calculated for this frame,
wherein the at least one PHY chip (4) transmits the transmission data contained in the frame via the at least one communication channel (3), if the comparison of the MAC checksum of the frame with the PHY checksum delivers identical values, and
wherein the at least one PHY chip (4) or the network device (2) executes at least one specified or specifiable action, if the comparison of the MAC checksum of the frame with the PHY checksum delivers values that are not identical.

7. The method according to claim 6, wherein the at least one specified or specifiable action is one or more of the following actions:
reporting an error to an error-handling module, especially an error-handling hardware or software module;
stopping the at least one MAC chip (5) from transmitting frames to the at least one PHY chip (4) or stopping the at least one MAC chip (5) from transmitting frames—via the at least one PHY chip (4)—to a port, if the comparison of the MAC checksum and the PHY checksum for a frame designated for the port has revealed non identical values;
discarding the frame;
stopping the network device (2) from sending data into the computer network (1);
further executing the comparison of the PHY checksums and the MAC checksums of additional frames, and in the case that in the following comparison of the additional frames a specified or specifiable number of non identical checksums occurs for the same MAC chip (5):
reporting an error to an error-handling module, especially an error-handling software module, or
stopping the at least one MAC chip (5) from transmitting frames to the PHY chip (4), or
stopping the at least one MAC chip (5) from transmitting frames—via the PHY chip (4)—to a port, if the comparisons of the MAC checksum and the PHY checksum for frames designated for the port have revealed non identical values, or
stopping the network device (2) from sending data into the computer network (1).

8. The method according to claim 7, further comprising discarding the frames for which the comparison reveals non identical checksums.

9. The method according to claim 7, wherein the at least one specified or specifiable action of stopping the at least one MAC chip (5) from transmitting frames to the at least one PHY chip (4), stopping the at least one MAC chip (5) from transmitting frames via the at least one PHY chip (4) to a port, or stopping the network device (2) from sending data into the computer network (1), further comprises reporting an error.

* * * * *